INVENTOR.
LOUIS A. KAMENTSKY

United States Patent Office 3,413,464
Patented Nov. 26, 1968

3,413,464
METHOD FOR MEASURING THE NUCLEIC ACID IN BIOLOGICAL CELLS AFTER ENHANCEMENT IN AN ACIDIC SOLUTION
Louis A. Kamentsky, Briarcliff Manor, N.Y., assignor to International Business Machines Corporation, Armonk, N.Y., a corporation of New York
Filed Apr. 29, 1965, Ser. No. 451,947
12 Claims. (Cl. 250—43.5)

ABSTRACT OF THE DISCLOSURE

A method for high speed measurements of the nucleic acid per unit volume of biological cells in which the cells to be measured are prepared to enhance the radiant energy absorption difference between cells with large and small amounts of nucleic acid by suspending the cells in an acetic acid solution having a pH near 2, specifically 2.1. The cells are then individually irradiated with energy from a light source and a measurement of the loss in incident energy at at least two wavelengths is made to provide a discrete electrical output relating to each wavelength. One of the wavelengths is within the range of wavelengths which is absorbed by a nucleic acid while the other wavelength is outside the range which is substantially absorbed by a nucleic acid. The losses measured are due, at one wavelength, to absorption by nucleic acids and, at the other wavelength, to absorption by nucleic acids and to scattering of the incident light. The signals resulting from the measurement (obtained from a photomultiplier tube) are applied to the orthogonally disposed electrodes of an oscilloscope and a display is generated which represents the amount of nucleic acid per unit volume of a specific cell. Apparatus used to accomplish the method is also disclosed which consists of a broad band source of radiant energy; a capillary tube for interposing individual cells in the path of the radiant energy, sensors for detecting the changes in intensity due to absorption and light scattering by the cells and a display device for visually indicating the nucleic acid per unit volume of a cell.

---

Studies made in the recent past have indicated that the presence of cancer can be detected by measuring chemical changes in specific cells found in the body which may be obtained from a donor by biopsy, by irrigation of body organs such as the uterus or by swabbing of organs such as the uterine cervix. The above mentioned studies have indicated that an increase in the nucleic acid (DNA or RNA) in a sample over normal amounts of some cells is indicative of the presence of cancer in the cells of the examined organ of the donor. A large increase in the quantity of nucleic acids of certain cells in a sample has been proposed as an indication of cancer and techniques for measuring the increase of nucleic acid from a normally expected amount of single cells have recently been developed. Such measurements take advantage of the fact that nucleic acids have an absorption maximum near the wavelength of 2537 A. Usually a cell sample from a donor is placed on a slide and stained in a well known manner so that, by use of a scanning technique, each individual cell on the slide can be irradiated and an absorption measurement made to determine whether or not the nucleic acids are present in normal or abnormal amounts. A co-pending application entitled "Cell Classification Method and Apparatus" in the name of L. Kamentsky and assigned to the same assignee as the present invention describes such an absorption measurement technique. Another technique disclosed in another co-pending application entitled "Cancer Cell Recognition" in the name of L. Kamentsky and assigned to the same assignee as the present invention utilizes a pattern recognition technique to differentiate between normal and abnormal cells using as a criterion the changes in the shape of an absorption characteristic when normal and abnormal cells are compared. These techniques have been relatively successful but can be applied only where a limited number of samples must be processed. Where, however, it is desired to apply mass screening techniques to a large population to process 100,000 or more cells per sample, the measurements as implemented above would be too time consuming and costly. The time and economic factors which militate against the use of the above mentioned techniques where mass screening is necessary result from the fact that while they are significantly faster than manual screening techniques, the decrease in processing time is not great enough to make their use feasible in the mass screening area. An additional factor militating against the above mentioned techniques is the fact that even in an abnormal sample, cancer cells occur infrequently making it necessary to closely check each individual cell. Because of this, high speed, high accuracy automatic testing of each cell appears to be the only way to overcome the time, personnel and economic factors which limit the use of mass screening.

One of the principal reasons why deaths due to cancer have been decreasing in recent years is the emphasis by the medical profession on early detection. The recent report by the President's Commission on Heart Disease, Cancer and Stroke in its Report to the President in Volume 1, p. 15, December 1964, indicates that with respect to cancer of the cervix, there is almost 100% survival and cure for those whose receive early diagnosis and treatment. Early detection and cure of cervical cancer has been made possible through the use of the well known Papanicolaou smear test. This test has the advantage that samples for testing can be obtained easily by a physician or by the patient herself and, as a result, annual checking for cervical cancer has become an accomplished fact in many localized areas. It is believed in many quarters that cervical cancer will cease to be a cause of death in this country, indeed, on a world wide basis, if samples from the total female population can be screened on an annual basis. As has been mentioned, present manual and automatic cell screening technique are relatively time consuming and expensive. Further, the available techniques suffer from a certain amount of inaccuracy because, in the case of the measurement of absorption maxima of nucleic acids in which slides are scanned by a light beam, large cell size or cell cluster may result in an indication of an abnormal amount of nucleic acid where the density of nucleic acid is actually normal.

From the foregoing, therefore, it may be seen that a need exists for a cancer detection technique which is adapted for mass screening of samples, which is fast and accurate and which takes into account such factors as the size and nucleic acid content of the cells being measured.

It is, therefore, an object of this invention to provide cancer detection apparatus and method which are adaptable for mass screening.

Another object is to provide apparatus and method which are superior to prior techniques in both speed and accuracy.

Another object is to provide apparatus and method which is less expensive and time consuming than prior techniques.

A further object is to provide apparatus and method which takes into account cell size by eliminating effects due to cell size.

A further object is to provide apparatus and method which operates on the principle of detection of the presence of abnormal amounts of nucleic acids per unit volume in a suspected cell.

A further object is to provide apparatus and method which indicates the presence of abnormal cells by detecting nucleic acids in a cell in increased amounts.

Still another object is to provide a means for displaying the measurements made on a sample which clearly indicates the presence or absence of abnormal cells.

Still another object is to provide a method and apparatus which because of the absorption capability of nucleic acids is enhanced by the use of isotonic solutions of sodium acetate and acetic acid at a pH of 2.1 permits the detection of cancer cells in suspected specimens.

A feature of this invention is a method for detecting abnormal amounts of nucleic acids in biological cells which includes the steps of preparing a cellular sample to enhance the radiant energy absorption difference between cells with large and small amounts of nucleic acid and irradiating the sample from a radiant energy source. Also included is the step of measuring the loss in incident radiant energy of each cell of the sample at at least two wavelengths to provide a discrete electrical output relating to each wavelength.

Another feature is the utilization of a method which further includes the step of providing an output based on the vector summation of discrete electrical outputs to determine the resultants of the measured losses.

Another feature is the utilization of a method in which the step of providing an output includes the step of generating a visual display of the resultants of the measured losses.

Still another feature is the utilization of a method in which the step of generating a visual display includes the step of displaying at least a portion of a trace on a display surface generated by the orthogonal co-action of the signals with a writing medium; the position of the trace on the surface indicating different amounts of nucleic acid per unit volume.

Still another feature is the utilization of a method wherein the step of preparing a cellular sample to enhance the radiant energy absorption difference between cells includes the step of suspending the cellular sample in a solution at a pH near 2.

Another feature of this invention is the utilization of a system for detecting the amount of nucleic acids per unit volume of cellular bodies which consists of a source of radiant energy adapted to project radiation over a broad wavelength range in a given path and means for interposing a plurality of cellular bodies seriatim in said radiant energy path. Also included are means for simultaneously detecting changes in intensity of the radiant energy due to absorption and light scattering by said cellular bodies at a number of wavelengths.

Still another feature is the utilization of display means adapted to provide a visual record of the absorption of the radiant energy in a unit volume of the cellular bodies.

Yet another feature of this invention is the utilization of a transparent member having a channel disposed therein having a bore of sufficient size to pass only a single cell at a time for interposing the cellular bodies seriatim in the radiant energy path.

The foregoing and other objects, features and advantages of the invention will be apparent from the following more particular description of a preferred embodiment of the invention, as illustrated in the accompanying drawings.

Figure 3:
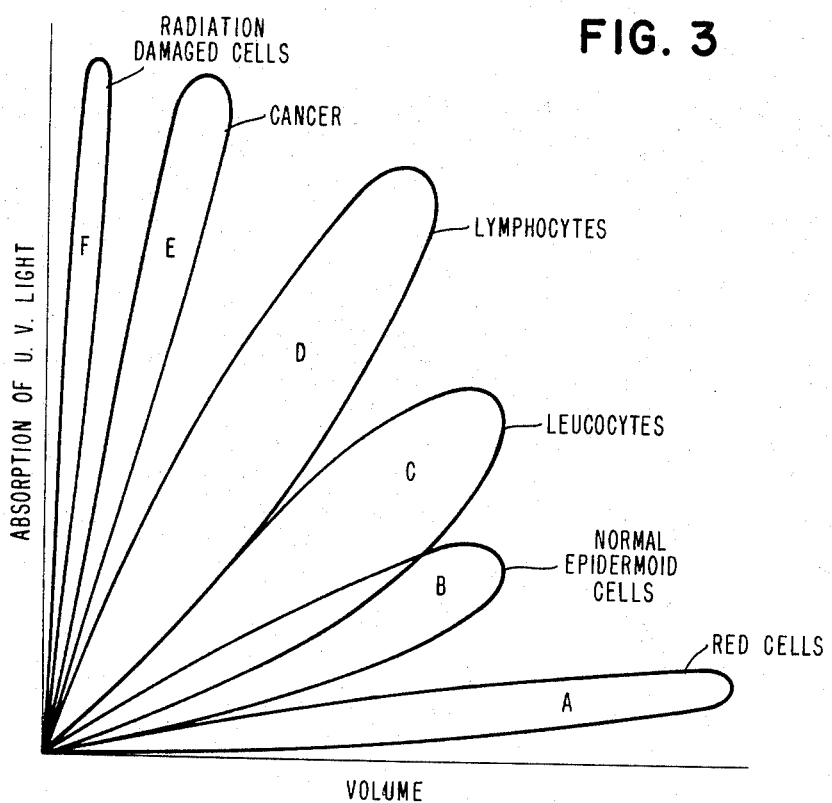

FIG. 3 shows a plot of the absorption of ultraviolet light of a given frequency per unit volume of a number of types of cellular bodies. The plot shows outlines of the expected distribution of the cellular bodies according to their type or condition. The actual plot obtained on an oscilloscope display would consist of a plurality of dots which would fall within one of the outlined regions in accordance with the nucleic acid content per unit volume of each cell.

In accordance with the present invention, a method and apparatus have been developed for rapidly scanning populations of the order of 100,000 cells in 2 or 3 minutes. The population of cells is obtained in a 4:1 mixture of isotonic saline and ethanol. Other fixative solutions, as well as non-fixative salt solutions may be used but, the aforementioned 4:1 saline and ethanol solution provided the best results. The samples can be obtained by a physician or from the patients themselves utilizing, in the case of cervical samples, for instance, kits readily obtainable from hospitals or drug companies. To prepare the samples for testing, to avoid leaching out of the constituents of the cells, and to standardize the degree of protein denaturation without destroying the ultraviolet absorption characteristics of the nucleic acids, the samples were resuspended within 2 weeks from the time of taking in a solution of 50 percent ethanol and 2 percent acetic acid. It has been found with utilization of this fixative that the samples can be stored for as long as 3 months with little or no deviation between the results obtained at the beginning of that period and the results obtained at the end of the period. In preparing the samples for test, it has also been found that the difference in absorption between cells with large and small amounts of nucleic acid is emphasized if the cells are resuspended in an aqueous solution of sodium acetate and acetic acid which has a pH near 2, specifically 2.1 and a sodium molarity of approximately .15. At pH's and molarities away from this point, there is no consistency in the results obtained. The inconsistency can be accounted for in part, from the increase in nucleic acid absorption with its denaturation at low values of pH. It has been found that at a pH of other than 2.1, that a sample containing cancer cells may appear as normal. In one experiment, a sample containing cancer cells in a sodium acetate and acetic acid solution of pH 3.8 could not be differentiated from a sample containing normal cells in a solution having a pH of 2.1. Other tests using different cancer cells and solutions of different pH showed a similar trend. Absorption by DNA and RNA were increased by almost a factor of 2 by the use of solutions having pH's near 2. It is believed that solutions of this value of pH cause an unwinding of the molecular structure of the nucleic acids thereby enhancing the absorption capability of each cell. While this phenomenon of unwinding of nucleic acid molecules has been demonstrated elsewhere, it is believed that the present method and apparatus are the first to apply the phenomenon to enhance the absorption capabilities of individual cells to provide a meaningful measurement bearing on the presence or absence of cancer cells in a sample being tested.

The cells to be studied are filtered using a Buckbee Mears 250 lines per inch micromesh screen fitted into a Swinny filter after which the cells are suspended in 2 ml. of an aqueous solution of sodium acetate and acetic acid at a pH near 2. After filtering and suspension in the solution, the sample is further processed in the apparatus of FIG. 1.

Figures 1, 2:
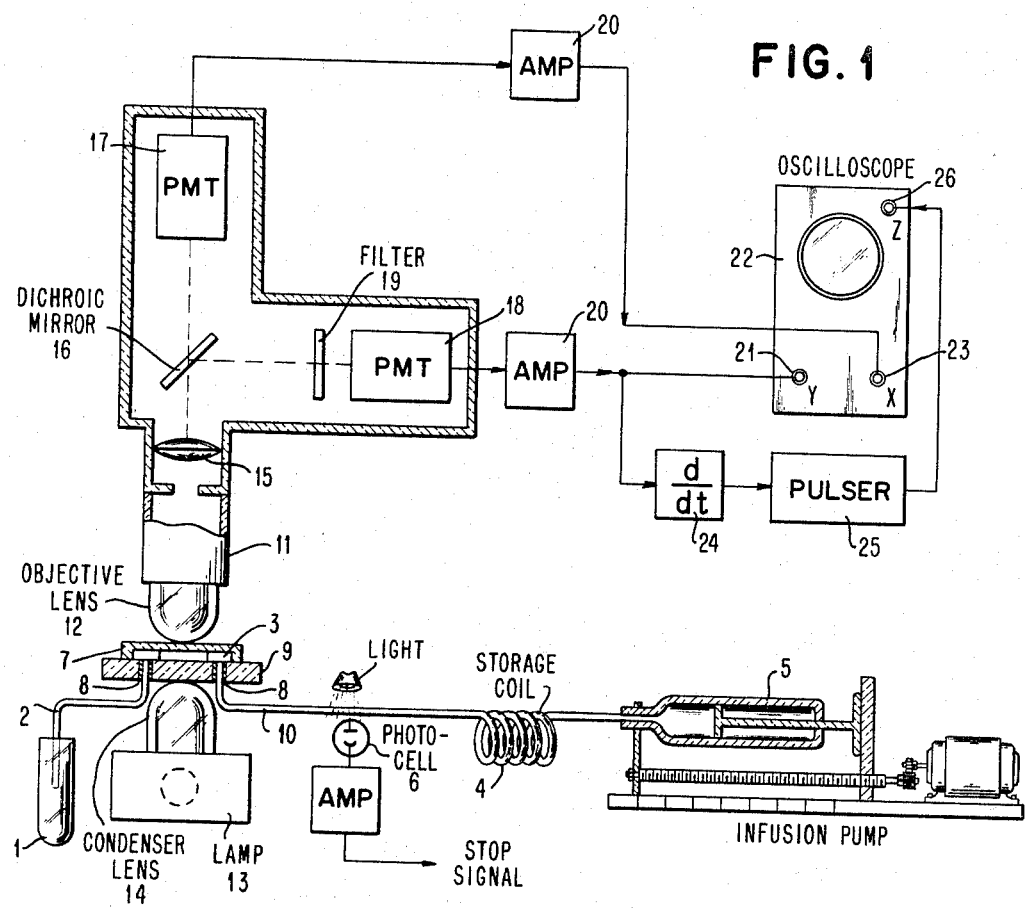
FIG. 1 shows a partial schematic and block diagram of the apparatus utilized for making high speed measurements of biological cells.
FIG. 2 shows an enlarged view of the transparent member and channel arrangement which permit measurements of absorption and light scattering to be made on individual cells of a biological sample.

In FIG. 1 the sample to be tested is ultimately delivered to a test tube or other container 1 which is connected by tubing 2 to one side of a flow channel 3. The other side of flow channel 3 is connected to a storage coil 4 of Teflon tubing and, a syringe 5 connected to coil 4 controls the fluid flow through the tubing and channel 3. The coil of Teflon tubing 4 may be mounted on a pipette shaker (not shown) to keep the cells in suspension. The sample to be tested is initially placed and held in coil 4 until the start of the test. The sample then may be infused into flow channel 3 at a given rate with a Harvard Apparatus infusion/withdrawal pump, for instance. A convenient infusion rate has been found to be 0.5 ml. per minute. An air bubble detector consisting of photocell 6 detects the presence of air bubbles placed at the beginning and end of the sample initiating signals which start and stop a display. The sample is caused to flow through a $100\mu \times 100\mu$ constriction in flow channel 3 and is discharged into container 1 for later use. FIG. 2 shows the details of flow channel 3 through which the sample is caused to flow. Flow channel 3 has a bow-tie shape which is obtained by cutting into a quartz microscope slide 7 using an ultrasonic cutter. After cutting, the groove can be polished. Holes 8 are then drilled into a quartz cover slip 9 to register near the ends of flow channel 3. Quartz cover slip 9 is then placed over channel 3 and slide 7 is heated to cause wax to flow by capillary action to fill the area under cover slip 9 in contact with slide 7. Polyethylene tubing 2 discharges the sample into container 1 while tubing 10 carries the sample from the storage coil 4 prior to its entrance into flow channel 3. Polyethylene tubing 10 is connected to storage coil 4 with a Touhy-Borst adaptor (not shown).

Cover slip 9 and quartz slide 7 containing flow channel 3 and its associated polyethylene tubing 2, 10 is then mounted on the stage of a microscope 11 having a Karl Zeiss ultrafluor 100/1.25 glycerine immersion objective lens 12 which images the 100 micron section at the center of flow channel 3 on to an aperture. A light source 13 consisting of a Hanovia low pressure mercury lamp mounted in a water cooled jacket and a Karl Zeiss 0.85 NA immersion condenser 14 which images the source 13 on the channel 3 is fitted into the condenser mount of the microscope 11. Light source 13 is a source of ultraviolet light which radiates much of its energy at 2537 A. which is near the wavelength of maximum absorption of ultraviolet light by nucleic acids (DNA and RNA). A quartz lens 15 and a dichroic mirror 16 image light from the back plane of the objective lens 12 of wavelengths greater than 4000 A. on to the face of an EMR 541A photomultiplier tube 17 and reflect shorter wavelengths at a 90° angle such that the reflected beam is imaged on an EMR 541F solar blind photomultiplier tube 18 after passing through a 3 mm. quartz cell filter 19 containing 1-4 diphenyl butadiene dissolved in ethanol. The filter 19 and photomultiplier tube 18 act to effectively isolate the 2537 A. light.

The cells flowing at rates exceeding 500 cells per second produce pulses of approximately 200 microsecond duration at the outputs of photomultipliers 17 and 18. Photomultiplier 17 measures the light scattered by the cells out of the acceptance cone of the high numerical aperture objective from the lower numerical aperture condenser. Photomultiplier 18 measures the absorption of 2537 A. light by each cell as it passes through flow channel 3. The single pulse resulting from photomultiplier 17 which measure the loss in light due to its scattering by the cells is 30 times smaller than the absorption pulse with equal incident energies on both photomultipliers, but sufficient energy is present to give good signal to noise ratios of the signals from both photomultipliers. Scatter signals on this order of magnitude have been shown by experiments to give the best estimate of cell size of several methods tested which included measurement of the protein contained in the cells measured by absorption at 2900 A. or 3130 A. and the change in electrical conductivity across channel 3 caused by the passage of cells.

The outputs of pihotomultipliers 17 and 18 were band limited from 300 c.p.s. to 5 kc.; amplified in amplifiers 20 which may be integral with the oscilloscope provided and clamped to zero. The amplified output signal from photomultiplier 18 which can be characterized as the absorption signal is connected to the vertical deflection plates 21 of oscilloscope 22 which, for instance, may be Tektronix 536 oscilloscope. The output signal from photomultiplier 17 which can be characterized as the scattering signal is connected to the horizontal deflection plates 23 of oscilloscope 22. Each cell as it passes through channel 3 thus produces a line or resultant on the indicator tube of oscilloscope 22, the end point of which has coordinates determined by the magnitudes of the two signals. To provide a meaningful display, the output of photomultiplier 18 is also introduced into a differentiating circuit 24 of a type well known to those skilled in the electronic arts. The absorption pulse or signal is differentiated and the zero crossing of this signal initiates a pulse of 1 microsecond duration from a pulser 25 which is connected to a Z-axis or intensity modulating terminal 26 to cause only the end of the oscilloscope trace to be intensified. By setting the oscilloscope beam intensity so that only a single dot appears on the screen for each cell at coordinates determined by the measurements of cell volume and nucleic acids, it is possible to obtain a measurement for each cell of the nucleic acid content per unit volume. By attaching a camera to the oscilloscope, it is possible to obtain a permanent record of the distribution of the cells in a particular sample. From the foregoing, it should be apparent that absorption per unit volume measurements will place a cell having a high nucleic acid content in the left hand portion of the oscilloscope screen. Thus, by masking the oscilloscope in an appropriate manner, a record of the number of cells most likely to be cancer can be obtained with the camera. Once the mask has been applied to a scope face, the indications of abnormal or cancer cells can be utilized to trigger a photocell placed adjacent the unmasked area. The photocell, in turn, can trigger an alarm, permitting unmonitored testing until the alarm is actuated. The output provided need not be visual but may be an analog or digital signal which is capable of being utilized in conjunction with data processing equipment. It should also be appreciated that other parameters relating to the determination of abnormalities in biological cells can be made simultaneously with the measurements already described. For instance, measurements can be made, at other wavelengths, of the absorption of ultraviolet light by protein in the cytoplasm of a cell. Thus, cells having a high absorption due to protein at another wavelength can provide another measurement which in conjunction with measurements such as described above can be useful in a display or computer to provide more accurate information on an individual cell. FIG. 3 shows a plot of nucleic acid absorption vs. volume for different types of cells. It is significant that normal cells of a given type assume a specific position on the plot while all cancer cells assume a position which is substantially the same regardless of cell type. It should be appreciated that the various regions outlined in FIG. 3 are actually regions consisting of a large number of individual cells which normally show up on an oscilloscope screen as a plurality of individual dots. The outlines labelled from A through D show regions where the various types of normal cells can be expected to fall while the outlines E and F show regions where cancer and radiation damaged cells, respectively, can be expected to fall. Region A shows an outline of a region within which normal red blood cells can be expected to fall. Of the various cellular bodies tested, red blood cells had the lowest absorption of ultraviolet light per unit volume at a wavelength of 2537 A. Leucocytes and epidermoid cells fell into regions B and C, respectively and had somewhat higher absorptions than that obtained for red cells. Of the normal cells, lymphocytes in region D had the highest absorption per unit volume because of the large amount of DNA in the nucleus of these cells. Tests of these normal cellular bodies assume characteristic patterns to such an extent that for a given setting on the gains of the photomultiplier amplifiers of FIG. 1 it is possible to identify the different types of cells when they are present in a given sample.

Region E is the region into which most abnormal or cancer cells fall. In general, it can be stated that the abnormal cells show the highest absorptions per unit volume with the exception of cells which have been exposed to and damaged by radiation. In the course of experimentation, only one type of cancer tested, a stroma sarcoma of the endomitrium, presented a normal distribution and, in other instances, normal cells presented high absorptions indicative of cancer. Such distributions, however, were exceptions and the departure from what was expected can be explained by unusual circumstances in each case. For instance, it turned out that such exceptional cells appeared in specimens obtained from some post-menopausal women or after treatment from a cured cancer. The exceptions which arose fell into clinically well defined areas so that a patient having a history which fell within any of these well defined areas could be segregated and have special measures taken in view of the circumstances to provide more meaningful testing.

In addition to uterine material obtained by vaginal irrigation, specimens of cell suspensions were prepared from a variety of surgically resected tumors and comparisons were made, where possible, using the apparatus of FIG. 1 with cell suspensions of comparable benign tissues. Among the tumors examined were epidermoid carcinomas of the uterine cervix, and lung, keratinizing squamous carcinomas of mouth and pharynx, adenocarcinomas of endometrium, colon, breast and ovary and certain lymphomas. Benign epithelium of the uterine cervix and oral and colonic mucosa was obtained and when compared with the suspensions prepared from tumors, the latter suspensions provided consistently higher absorption patterns per unit volume at 2537 A. than did the suspensions prepared from benign tissues. In like manner, absorption per unit volume was higher for reticulum cell sarcoma, lymphosarcoma and Hodgkin's lymphoma when compared with benign lymph nodes. In all cases, the patterns obtained were consistent and reproducible with a minimum of deterioration even after repeated use. In all cases, where specimens or cell suspensions indicated the presence of cancer, confirmation was provided by examination of cytologic smears by a pathologist. Conversely, suspensions were prepared from cancer tissue and tested without prior knowledge of the existence of cancer by an experimenter and, in all cases, with certain exceptions as mentioned hereinabove, the apparatus of FIG. 1 provided a positive indication of the existence of cancer.

The advantages provided by the apparatus and method disclosed herein relative to prior art methods are significant. The processing time of 2–3 minutes per sample with a permanent record of the results available by a camera attached to an oscilloscope or by computer storage techniques makes the apparatus of FIG. 1 amenable to mass screening techniques. Thus, positive indications of cancer in any specimen can initiate further detailed testing by medical personnel and undoubtedly will increase the incidence of cures by providing early detection of the presence of cancer.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for detecting abnormal amounts of nucleic acid in biological cells comprising the steps of;
   suspending a cellular sample in a solution at a pH near 2 to enhance the radiant energy absorption difference between cells with large and small amounts of nucleic acid,
   irradiating said sample from a radiant energy source, and
   measuring the loss in incident radiant energy of each cell of the sample at at least a single wavelength to provide at least a discrete electrical output representative of the amount of nucleic acid in said cell.

2. A method according to claim 1 wherein said solution at a pH near 2 is an isotonic aqueous solution of sodium acetate and acetic acid at a pH near 2.

3. A method according to claim 1 wherein the solution at a pH near 2 is an isotonic aqueous solution of sodium acetate and acetic acid at a pH of 2.1.

4. A method according to claim 1 wherein the step of irradiating said sample includes the steps of;
   introducing the cells of the sample seriatim into a constricted flow channel which is irradiated by said source, and
   irradiating each cell of said sample individually with ultraviolet light.

5. A method according to claim 4 wherein the step of irradiating each cell with ultraviolet light includes the step of;
   irradiating each cell with ultraviolet light at wavelengths which include 2537 A. and wavelengths which are outside of the wavelengths which are substantially absorbed by nucleic acids.

6. A method according to claim 1 further including the step of;
   measuring the loss in incident radiant energy of each cell of said sample at at least another wavelength to provide a discrete electrical output representative of the volume of said cell.

7. A method according to claim 6 wherein the step of measuring the loss in incident radiant energy at at least a single wavelength and at another wavelength includes the steps of;
   dividing said radiant energy into separate paths,
   filtering the radiant energy received upon irradiation of an individual cell,
   delivering said filtered radiant energy to light sensors adapted to provide a signal proportional to the amount of incident radiant energy.

8. A method according to claim 6 further including the step of;
   applying said discrete electrical outputs at said wavelengths to a measuring device to determine the resultant of the measured losses.

9. A method according to claim 8 wherein the step of applying said discrete electrical outputs includes the step of;
   generating a permanent record of the resultants of the measured losses.

10. A method according to claim 8 wherein the step of applying said discrete electrical outputs to a measuring device includes the step of;
    generating a visual display of the resultants of the measured losses.

11. A method according to claim 10 wherein the step of generating a visual display includes the step of;
    displaying at least a portion of a trace on a surface generated by the orthogonal co-action of said electrical outputs with a writing medium, the positions of said at least a portion of said trace on said surface indicating different amounts of nucleic acid per unit volume.

12. A method according to claim 11 wherein the step of displaying at least a portion of a trace on a surface generated by the orthogonal co-action of said electrical outputs with a writing medium includes the steps of;
    amplifying said electrical outputs in an amplifier,
    applying one of said electrical outputs directly to deflection elements of a display device, simultaneously differentiating said one of said electrical outputs to trigger a pulser adapted to provide an output signal when the differentiated signal crosses a zero axis,
applying the pulser signal to control the beam intensity of said display device, and
applying the other of said electrical outputs to an orthogonally disposed deflection element of said display device to provide a display which measure the nucleic acid per unit volume of each of said cells.

References Cited

UNITED STATES PATENTS

| | | | |
|---|---|---|---|
| 2,690,093 | 9/1954 | Daly | 88—14 |
| 2,807,416 | 9/1957 | Parker et al. | 88—14 X |
| 2,974,227 | 3/1961 | Fisher et al. | 250—43.5 |

FOREIGN PATENTS 679,711  9/1952  Great Britain.

WILLIAM F. LINDQUIST, *Primary Examiner.*